P. HOFWEBER.
VEHICLE JACK.
APPLICATION FILED NOV. 15, 1915.

1,196,690.

Patented Aug. 29, 1916.

Witness
Oscar V. Payne

Inventor
Peter Hofweber
By
Attorney

UNITED STATES PATENT OFFICE.

PETER HOFWEBER, OF LA CROSSE, WISCONSIN.

VEHICLE-JACK.

1,196,690.

Specification of Letters Patent.

Patented Aug. 29, 1916.

Application filed November 15, 1915. Serial No. 61,641.

*To all whom it may concern:*

Be it known that I, PETER HOFWEBER, a citizen of the United States, residing at La Crosse, in the county of La Crosse and State of Wisconsin, have invented certain new and useful Improvements in Vehicle-Jacks, of which the following is a specification.

This invention relates to vehicle jacks of the type employing a single throw-lever suitably fulcrumed and positioned on a turnable base structure and adapted to engage the axle of a vehicle for raising the same when a downward pressure is brought to bear on the free end of the lever.

The object of the invention is to develop a construction which will afford a cheap and practical device for jacking up vehicles, and which is especially advantageous for use in connection with motor vehicles wherein the device is so constructed that it will not interfere with the rear construction of the vehicle when brought into use.

The above outline of the features of the invention where directed to details, is to be understood as relating to the preferred form of the device which is selected to illustrate the structural and operative characteristics, and not as indicating the scope of the invention, for it is obvious that while all of the above features, as above outlined and hereinafter described may enter into coöperation of the most desirable embodiment of the several features of the invention, many of these features involve novelty *per se.*

The invention will be more clearly set forth upon reference to the accompanying drawings, in which:—

Figure 1:
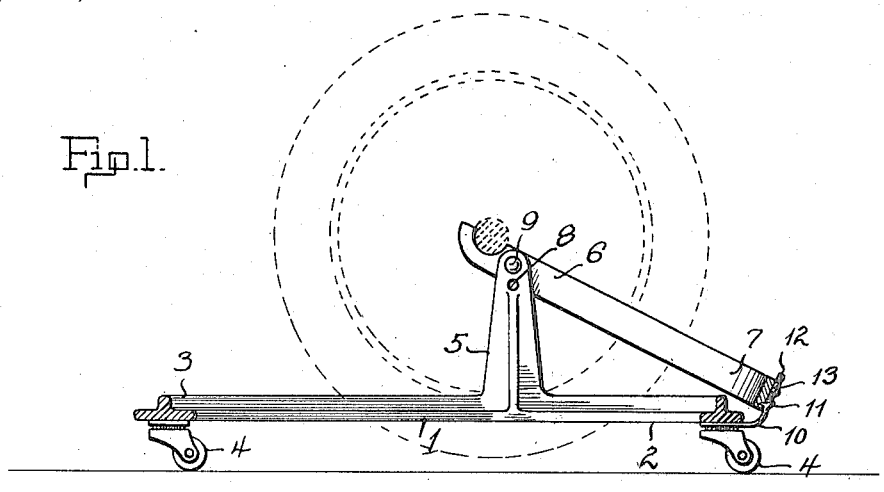
Figure 2:
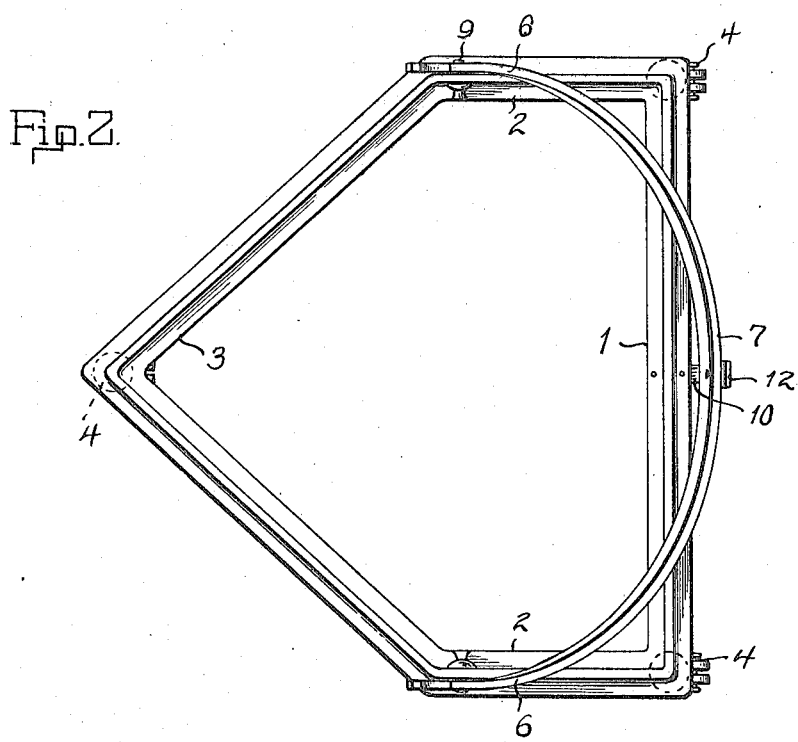

Figure 1 is a section through the longitudinal center of the device illustrating its adaptation to a vehicle axle when the same is raised; Fig. 2 is a top plan view of the device.

Referring to the drawings in detail, 1 represents the base frame which comprises a rectangular portion 2 and a triangular portion 3. The frame 1 is suitably supported by the casters 4 which are located respectively near the corners of the rectangular portion and the apex of the triangular portion.

5 represents vertical standards which are located on the frame near the intersection of the triangular and rectangular portions; these standards are spaced apart by the width of the frame and positioned thereby to support an axle bodily by its opposite ends.

6 represents a single throw bow-shaped lever having its ends fulcrumed upon and positioned by the standards 5 and adapted to engage the axle of the vehicle near its ends. This lever 6 extends over the rectangular portion of the frame 1 and has an intermediate portion such as 7 through which to control the lifting action of the fulcrum ends which engage the vehicle axle.

In order to provide means for adapting the device to vehicles having axles of different height, the standards 5 are provided with openings such as 8 in which a pin 9 may engage for adjusting the vertical position of the lever. In order that the lever may be held down for keeping the vehicle axle in raised position, suitable means, such as the finger 10 may be employed for coöperating with the free end of the lever and holding the same down. In the present invention, this means is constructed to work automatically, and to this end comprises, as stated, a finger 10 carried by the frame 1 and extending outwardly therefrom and bent up and having a lip 11 for engaging a recess in the intermediate portion 7 of the lever; this finger is substantially flexible, and the lip thereof may be disengaged from the recess by a pusher 12 which is attached to the lever by the pin and slot connection 13, adapted to be pressed downward and disengage the lip from the recess.

While the device may be operated by hand, the several features above outlined, render it especially adapted to be operated by the foot of the operator, and, in this connection, when it is desired to jack up the vehicle, the device is placed in proper position under the rear axle, and when the fulcrum end of the lever 6 engages the opposite ends of the axle, simultaneously, pressure is brought to bear by the foot of the operator on the intermediate portion of the lever and the axle raised, as above stated, by means of the finger 10 engaging the recess of the lever, the lever will be held down. In lowering the vehicle the foot of the operator is adapted to engage the pusher and disengage the finger from the recess and allow the lever to be returned to its normal position, and thus lower the axle of the vehicle.

It will be readily seen that a device constructed in accordance with the present invention is especially adapted for use in connection with motor vehicles, in that the bow-shaped lever, together with the particular construction of the base frame leaves an unobstructed space between the standards which support the axle, which space may be occupied by the rear construction of the motor vehicle without interfering with the operation of the device. Another advantage of constructing the device in the manner set forth, is that it enables one to gain access to the rear construction of the vehicle when the vehicle is supported on the device over a pit, such as is provided in garages for working under a vehicle.

Claim:

In a vehicle jack, the combination of a base structure comprising an open frame, a pair of vertical standards located on the frame at diametrically opposite points, a single-throw lever fulcrumed on said standards adapted to bodily support an axle of a vehicle at the ends thereof, said lever having an intermediate bow-shaped portion overhanging the rear edge of the frame and by which the lifting action of the lever is controlled, said lever being positioned on the frame in a manner to leave an unobstructed space within the frame to permit access to the rear construction of the vehicle when supported on the device.

The foregoing specification signed at La Crosse, Wisconsin, this 27th day of October, 1915.

PETER HOFWEBER.

Copies of this patent may be obtained for five cents each, by addressing the "Commissioner of Patents, Washington, D. C."